Figure 7:
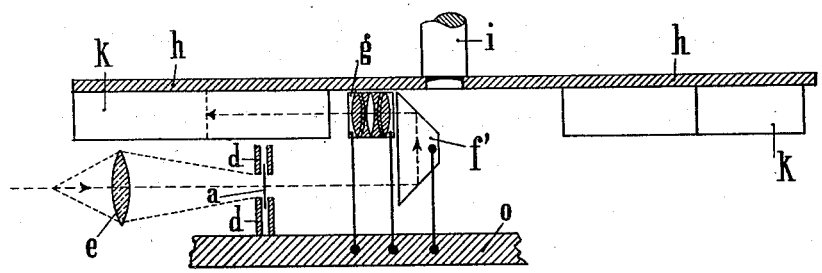

W. THORNER.
CINEMATOGRAPHIC APPARATUS.
APPLICATION FILED APR. 2, 1912.
1,151,978.
Patented Aug. 31, 1915.
3 SHEETS—SHEET 1.
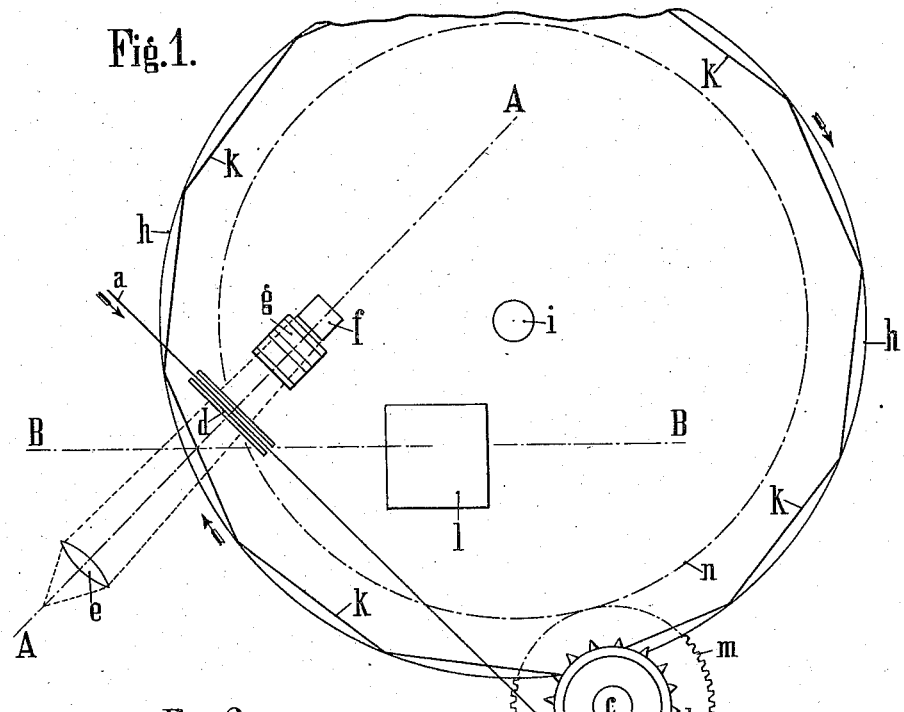
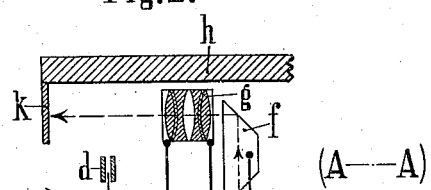
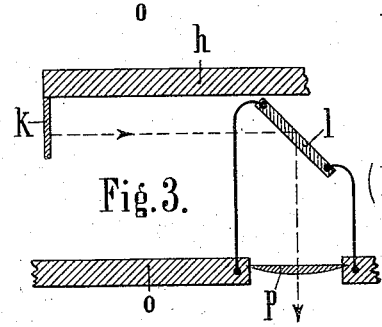
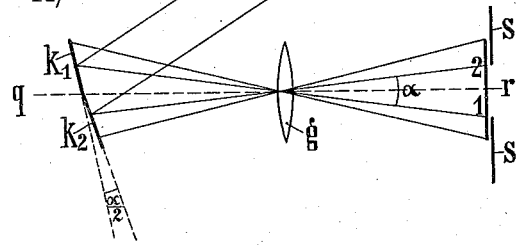

W. THORNER.
CINEMATOGRAPHIC APPARATUS.
APPLICATION FILED APR. 2, 1912.
1,151,978.
Patented Aug. 31, 1915.
3 SHEETS—SHEET 2.
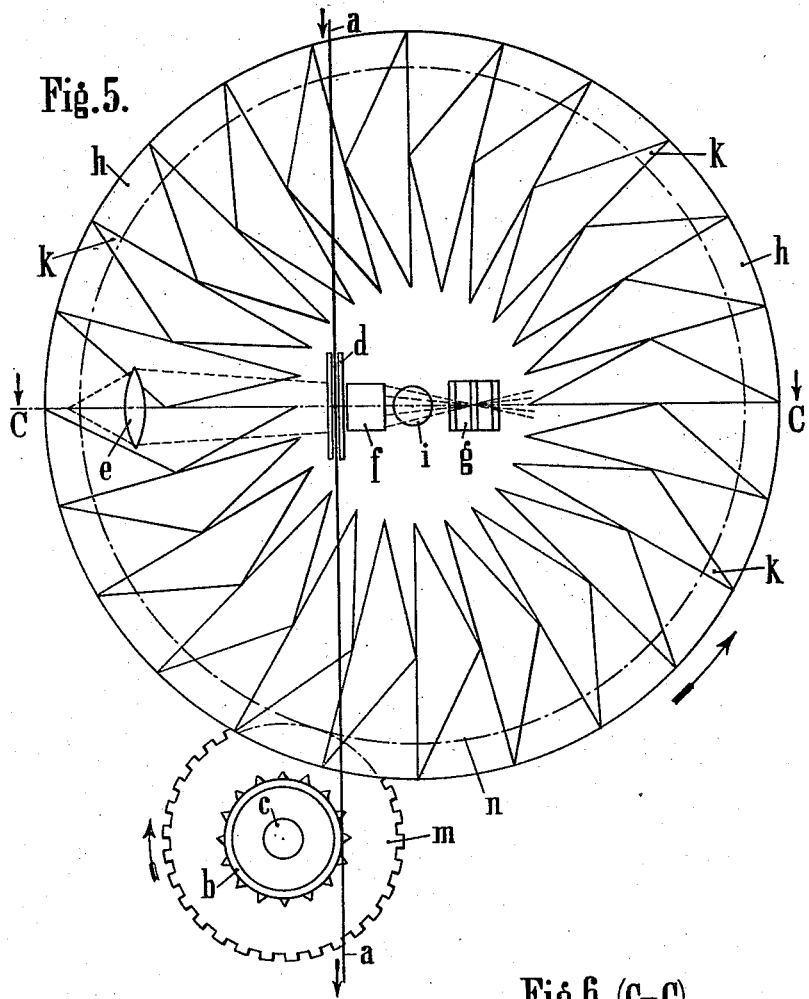
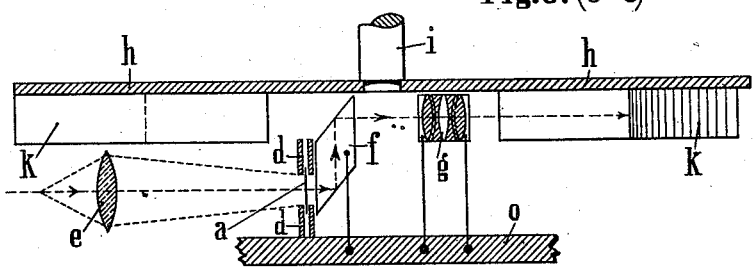

W. THORNER.
CINEMATOGRAPHIC APPARATUS.
APPLICATION FILED APR. 2, 1912.

1,151,978.

Patented Aug. 31, 1915.
3 SHEETS—SHEET 3.

UNITED STATES PATENT OFFICE.

WALTHER THORNER, OF BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

CINEMATOGRAPHIC APPARATUS.

1,151,978. Specification of Letters Patent. Patented Aug. 31, 1915.

Application filed April 2, 1912. Serial No. 688,016.

*To all whom it may concern:*

Be it known that I, Dr. WALTHER THORNER, citizen of the German Empire, residing at 19 Kleiststrasse, Berlin, Germany, have invented certain new and useful Improvements in Cinematographic Apparatus, of which the following is a specification.

The present invention relates to a cinematograph apparatus which is adapted to be used both for reproducing and for photographing cinematograph pictures. The apparatus belongs to that class in which the strip of film is continually moved, the effect of the continuity being compensated by the movement of optical elements.

The invention has for its object primarily to provide an apparatus of simple construction which will produce pictures of constantly uniform brightness. This end is attained by placing a ring of reflecting surfaces, and an objective in the path of the rays between the object (natural object or film) and the surface of the picture (film or projection screen), the arrangement of the reflecting surfaces of said ring being such that the reflecting surfaces cause rays of light from any direction falling thereon to converge inward, the ring and the objective being placed in the path of the intersecting rays between the window for the pictures and the ring of mirrors. This arrangement has as a result that rays of light passing through the center of the lens in a plane vertical to the axis of rotation of the ring of mirrors and falling with certain divergency on adjacent mirrors are approximately parallel beyond the mirrors. That is to say, when the apparatus is used for projection, the principal rays starting from identical points on adjacent pictures of the strip of film, that is to say to points corresponding to the same object point and falling on adjacent mirrors of the crown of reflectors are made parallel by the latter, so that they meet at the same point on the projecting surface with the result that the whole of the principal rays from the window across which the illuminating light is conducted, are reflected onto the projecting surface by the coaction of the two mirrors on which these rays fall.

An arrangement of the parts which lends itself to convenient construction is provided by guiding the film in such manner that its surface is parallel to the axis of rotation of the mirrors, and by arranging the film in this plane in such manner that it is displaced with respect to the plane of the crown of mirrors, so that the ray passing through the axis of the objective is shifted inside the apparatus parallel to itself.

In order to provide for advantageous conditions of observation a further reflector is preferably placed in the path of the rays between the mirrors of the reflecting ring and the projection surface, this additional reflector being adapted to reflect rays from the mirrors out of the plane of the ring of mirrors.

The invention is illustrated in the accompanying drawing in which—

Figure 8:
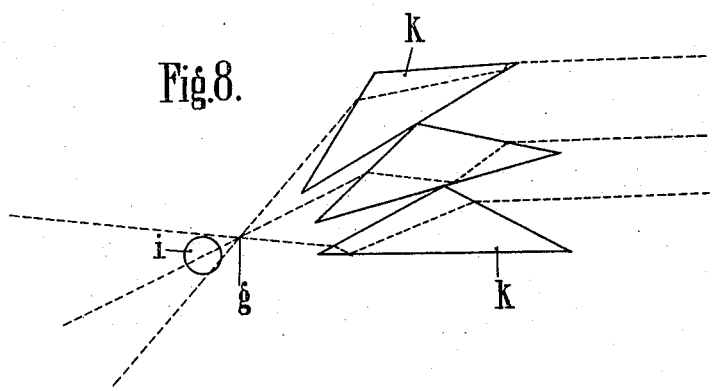

Figures 1 to 3 show the apparatus adapted for use as well as a projection apparatus as an apparatus for photographing pictures, the paths of the rays as indicated by arrows being the paths appertaining to the first-mentioned purpose. Fig. 4 shows the path of rays between two consecutive pictures and the corresponding mirror. Figs. 5 and 6 are an elevation and a section on the line C—C of Fig. 5 showing a form of construction in which the ring of reflectors is formed by prisms. Fig. 7 is a section, corresponding to Fig. 6, showing a modification of the apparatus shown in Figs. 5 and 6, and Fig. 8 illustrates the effect of the ring of prisms in the path of the rays.

Referring in the first place to Fig. 1, $a$ indicates the film which is fed along by the rotation of the toothed wheel $b$ about the axis $c$. The film $a$ passes through a window $d$ during its projection. The light from the projecting apparatus $e$ passes through the window $d$ and falls on a reflecting prism $f$ in which it is twice reflected (Fig. 2) so that after leaving the prism $f$ it travels parallel with its original path but in the reverse direction. It then passes through the lens $g$ which is at a distance from the window $d$ approximately equal to its focal length. After leaving the lens $g$ the light falls on the inside of the drum $h$ which is rotatable about the axle $i$ and is provided on its inside wall with a series of mirrors $k$ which are all parallel with the axle $i$ and whose normals intersect at the axis. The mirrors $k$ reflect the light onto a large fixed mirror $l$ (Fig. 3) which projects the light parallel with the axle $i$ into the projection screen. The screen (not shown on the drawing) is assumed to be in front of Fig. 1 parallel with the plane of the same. The shaft of the film feed wheel $b$ is provided with a toothed wheel $m$ meshing with another toothed wheel $n$ which is rigidly connected to the rear of the drum $h$ carrying the mirrors $k$. The dimensions of $m$ and $n$ are so proportioned that their ratio is equal to the ratio between the number of pictures passing the film window on each revolution of the wheel $b$ and the number of mirrors on the drum, so that each new picture arrives opposite a new mirror.

The window $d$, the prism $f$, the lens $g$ and the mirror $l$ are fixed to a plate $o$ and project into the interior of the drum $h$. This plate $o$ is omitted in Fig. 1 in order to render visible the parts below. Instead of providing the film feed wheel and the drum with separate axles, they may be rigidly connected with one another on a common axle, in which case one revolution of the wheel $b$ would have to displace as many pictures as there are mirrors on the drum. This arrangement has the advantage that inaccuracies in the drive arising from idle movement between the toothed wheels are excluded. The picture becomes stationary when the normals of two adjacent mirrors $k$ make an angle which is half as large as that made by the picture leaving the objective $g$. It is not necessary that the mirrors are arranged to form a regular polygon; they may be turned about axes parallel to the axle $i$, but a considerable departure from the regular polygon arrangement would be disadvantageous, since the mirrors would overlap to a certain extent. It is practically important to arrange the objective in such relation to the ring of reflectors that its axle is parallel to the plane of the reflector ring so that each ray parallel to the axis of the objective is immediately before and after its reflection at the mirror ring coincident with a plane perpendicular to the axis of rotation of the mirror ring. Since the distance of the objective from the strip of film may not vary, the correct focus must be obtained for various distances by providing exchangeable lenses $p$ (Fig. 3), or a set of lenses of variable focal length.

Fig. 4 shows the rays of two consecutive film pictures 1 and 2 at the moment of translation. The reflection inside the prism $f$ is omitted as unessential, and $r$ is the optical axis and $g$ the objective shown as a single lens. This view shows the principal rays from the pictures 1 and 2 which fall on their respective mirrors $k^1$ and $k^2$, provided there is a correct distance between the lens $g$ and the ring of mirrors. Assuming the angle formed by two lines passing from the principal point of the lens $g$ to the centers of two consecutive pictures being $\alpha$ as shown and the angle between two mirror surfaces being $$180° - \frac{\alpha}{2}$$

the reflected rays 1 and 2 are parallel and consequently produce a single picture. If the outside of a polygon of mirrors were used, the angle of the mirror surfaces would be $$180° + \frac{\alpha}{2}$$

and the rays 1 and 2 would diverge to the extent of the angle. In this case in order to produce a correct effect the mirror $k^1$ would reflect the picture 2 and the mirror $k^2$ the picture 1, but since no rays of light from these pictures fall on the corresponding mirrors the screen would be dark at the moment of translation.

The arrangement described provides a means of obtaining an absolutely uniform brightness of the projection. In order to attain this end, it is not only necessary to avoid all darkness, but the same parts of the picture must not be projected simultaneously by two mirrors, since in this case the brightness would be increased. For this reason a screen $s\ s$ is arranged behind the strip of film and must be adjustable and have exactly the same size as the picture. Even in the position shown in Fig. 4 a complete picture appears on the screen notwithstanding that the two halves of the picture are inverted, owing to each half of the picture being reflected by its opposite mirror on the correct place. The apparatus may also be used for colored projections by making the consecutive mirrors of differently colored glass.

In the form of apparatus shown in Figs. 5 and 6 the parts corresponding with those shown in Figs. 1 to 3 have the same references. The film is again marked $a$, the feed roller for the same $b$, the axis of the latter $c$, the window $d$, the condenser $e$, the prism placed in the path of the rays between the film and the crown of mirrors $f$, the lens $g$, the carrier of the crown of mirrors $h$, the axle of the latter $i$, the reflectors consisting in this case of prisms $k$, the toothed wheels of $h$ and $b$, $m$ and $n$, and the plate carrying the lens prism and window $o$. The action of the prisms is exactly the same as that of the reflectors according to Figs. 1 to 3, as will be seen from Fig. 8. The rays from the pictures on the film crossing in the lens $g$ and passing out of the lens in the form of a pencil emerge from the prisms of the crown of mirrors in a parallel direction, so that in this case again the advancing movement of the film in front of the window, and the rotation of the crown of prisms, has no effect on the brightness of the picture, on the projection surface.

The form of apparatus shown in Fig. 7 differs from that shown in Fig. 6 only by the prism $f$, which laterally displaces the rays from the window without altering their direction, being substituted by a prism $f^1$ which alters the reversal of direction of the laterally displaced rays.

In the form of construction shown in Figs. 5 to 7 it is not necessary to provide a special deflecting reflector analogous to the reflector 1, shown in Fig. 3, since the prisms allow the rays to pass through the crown itself.

What I claim is:—

1. A cinematograph apparatus comprising a rotatable ring of reflecting members adapted to transform parallel rays of light meeting the reflectors of the ring into rays which converge toward the inside of the ring, transporting means for a film strip, means for controlling the film speed in dependence from the reflector ring speed, a guide member for a film having a window and an objective inserted in the field of the crossing rays between the window and reflector ring.

2. A cinematograph apparatus comprising a rotatable ring of inwardly reflecting plane mirrors, transporting means for a film strip, means for controlling the film speed in dependence from the reflector ring speed, a guide member for a film having a window and an objective inserted in the field of the crossing rays between the window and reflector ring.

3. A cinematograph apparatus comprising a rotatable ring of inwardly reflecting plane mirrors including angles with each other smaller than two right angles, transporting means for a film strip, means for controlling the film speed in dependence from the reflector ring speed, a guide member for a film having a window and an objective inserted in the field of the crossing rays between the window and reflector ring.

4. A cinematograph apparatus comprising a rotatable ring of inwardly reflecting plane mirrors forming a regular polygon, transporting means for a film strip, means for controlling the film speed in dependence from the reflector ring speed, a guide member for a film having a window and an objective inserted in the field of the crossing rays between the window and reflector ring.

5. A cinematograph apparatus comprising a rotatable ring of inwardly reflecting plane mirrors, a transporting roller for a film strip rotatable about an axle parallel to the axle of the mirror ring and in dependence from same a guide member for a film having a window and an objective inserted in the field of the crossing rays between the window and reflector ring.

6. A cinematograph apparatus comprising a rotatable ring of inwardly reflecting plane mirrors arranged parallelly to the axis of rotation, means for transporting a film strip in a direction perpendicular to and in a plane parallel to the axis of rotation of the mirror ring with a speed dependent from the speed of rotation of the mirror ring, a guide member for a film strip having a window displaced in the direction of the mirror ring axis outside the surface of the mirror ring, an objective inserted in the field of the crossing rays between the window and reflector ring, reflectors arranged in the path of the rays between said window and objective and adapted to deflect the rays from the plane of the reflector ring to a plane laterally displaced with regard to said plane crossing said film window and a reflector adapted to deflect rays crossing the plane of the mirror ring into the mirror ring plane and vice versa.

7. A cinematograph apparatus comprising a rotatable ring of reflecting members adapted to transform parallel rays of light meeting the reflectors of the ring into rays which converge toward the inside of the ring, transporting means for a film strip, means for controlling the film speed in dependence from the reflector ring speed, a guide member for a film having a window and an objective inserted in the field of the crossing rays between the window and reflector ring, the axis of the objective being substantially parallel to the reflector ring plane.

In testimony whereof I have signed this specification in the presence of two subscribing witnesses.

Dr. WALTHER THORNER.

Witnesses:
Henry Hasper,
Woldemar Haupt.

Copies of this patent may be obtained for five cents each, by addressing the "Commissioner of Patents, Washington, D. C."